United States Patent [19]

Callan

[11] 4,092,282

[45] May 30, 1978

[54] HOT MELT SEALANT COMPOSITION

[75] Inventor: John E. Callan, Broken Arrow, Okla.

[73] Assignee: Cities Service Company, Tulsa, Okla.

[21] Appl. No.: 825,889

[22] Filed: Aug. 19, 1977

Related U.S. Application Data

[63] Continuation-in-part of Ser. No. 689,024, May 24, 1976, abandoned.

[51] Int. Cl.² .............................................. C08L 77/00
[52] U.S. Cl. ................................ 260/26; 260/27 EV; 260/27 BB; 260/40 R; 260/42.36; 260/829; 260/841; 260/857 PE; 260/857 G; 260/857 L; 260/857 D

[58] Field of Search ............... 260/26, 27 BB, 27 EV, 260/829, 841, 857 G, 857 PE, 857 L, 857 D, 40 R, 42.36

[56] References Cited

U.S. PATENT DOCUMENTS

| | | | |
|---|---|---|---|
| 2,570,895 | 10/1951 | Wilson | 260/857 D |
| 3,674,735 | 7/1972 | Callan | 260/42.36 |
| 3,846,370 | 11/1974 | Bunk | 260/42.36 |

*Primary Examiner*—James H. Derrington
*Attorney, Agent, or Firm*—Patricia J. Hogan

[57] ABSTRACT

Hot melt sealant compositions having superior adhesive bonding properties comprise butyl rubber, plasticizing or tackifying resins, and a reacted mixture of an alkaline earth metal hydroxide and a solid polyamide resin having a high amine value.

4 Claims, No Drawings

HOT MELT SEALANT COMPOSITION

CROSS-REFERENCE TO RELATED APPLICATION

This application is a continuation-in-part of copending application Ser. No. 689,024, filed May 24, 1976, now abandoned.

BACKGROUND OF THE INVENTION

1. Field of the Invention

This invention relates to sealant compositions and more particularly relates to hot melt sealants based on butyl rubber.

2. Description of the Prior Art

It is known that sealants are useful in various appliance, automotive, and construction markets for sealing joints, such as masonry-metal, glass-metal, and glass-glass joints. Sealants such as asphalt, mastics, and putty have some utility in this regard, but they have the disadvantages of containing solvents, exhibiting creep and sag at various temperatures, shrinking with age, and having unacceptable moisture vapor transmission rates with poor environmental stability. Hot melt butyl sealants have been found preferable to other prior art sealants in many ways. However, even these hot melt butyl sealants have properties which could bear improvement.

SUMMARY OF THE INVENTION

An object of this invention is to provide novel hot melt butyl sealant compositions.

Another object is to provide such compositions having improved adhesive properties.

These and other objects are attained by the provision of a hot melt sealant composition comprising (A) a butyl rubber component, (B) a resin selected from the group consisting of plasticizing and tackifying resins, and (C) a reacted mixture of (1) an alkaline earth metal hydroxide selected from the group consisting of magnesium, calcium, strontium, and barium hydroxides and (2) a solid polyamide resin having a molecular weight less than 10,000 and an amine value greater than about 50.

DESCRIPTION OF THE PREFERRED EMBODIMENTS

The butyl rubber component of the invention may be an unmodified butyl rubber but is preferably a butyl rubber than has been modified by crosslinking and/or compounding with conventional sealant additives, such as other elastomers, elastomeric resins, crystalline resins, etc. It ordinarily comprises at least about 20% by weight of the butyl rubber and up to about 80% by weight of additives.

Particularly preferred butyl rubber components are (A) the slightly crosslinked butyl rubbers of U.S. Pat. No. 3,674,735, especially such rubbers having Mooney viscosities (ML 1+3 at 260° F.) of about 50-60, (B) a blend of (1) a butyl rubber, (2) an ethylenevinyl acetate copolymer, and (3) a block copolyester resin, and (C) a blend of (1) a butyl rubber, (2) a rubbery styrene-olefin block copolymer, such as a styrene-ethylene-butylene-styrene block copolymer rubber, and (3) a block copolyester resin.

When the butyl rubber component includes a block copolyester resin, this resin is suitably a thermoplastic segmented copolyester elastomer consisting essentially of about 15-30% by weight of ester units derived from butanediol and a phthalic acid and about 85-70% by weight of units derived from polytetramethylene ether glycol 1500-3500 (i.e., a polytetramethylene ether glycol having an average molecular weight of about 1500-3500) and a phthalic acid, about 55-95% by weight of the phthalate units of the copolyester being terephthalate units.

The resin constituting the second component of the composition of the invention may be any one or more of the plasticizing and tackifying resins conventionally employed in sealant compositions. However, it is usually a hydrocarbon resin, such as a polystyrene, a vinyltoluene-alpha-methylstyrene copolymer, a polyterpene, a polybutene, a polyisobutylene, etc.; a phenolic resin, such as a modified alkylphenol-formaldehyde resin, a thermoplastic terpene phenolic resin, etc.; a chlorinated bi- or polyphenyl; a coumarone-indene resin; natural rosin; a modified rosin, such as a glycerol ester of polymerized rosin, an ester of hydrogenated rosin, etc., and mixtures thereof. The concentration of this component is not critical but is ordinarily in the range of about 25-200 phr, i.e., about 25-200 parts per 100 parts of the butyl rubber component.

The polyamide-hydroxide reaction product which constitutes the crux of the invention is a reaction product of (1) about 25-100 phr of a solid polyamide resin having a molecular weight less than 10,000 and an amine value greater than about 50 and (2) an amount of an alkaline earth metal hydroxide selected from the group consisting of magnesium, calcium, strontium, and barium hydroxides such as to provide a polyamide/hydroxide weight ratio of about 10-20/1. The hydroxide used to prepare the reaction product may be a commercial or purer material.

The compositions of the invention are prepared by compounding the aforementioned components and any optical ingredients in any suitable manner, e.g., by mixing and heating the ingredients in a low shear mixer, such as a sigma blade mixer, at about 300°–400° F. Ordinarily, the polyamide and alkaline earth metal hydroxide are reacted together prior to being admixed with the other ingredients, but they may be mixed separately with the other ingredients and allowed to react with one another under the mixing conditions.

Optional ingredients which may be incorporated into the compositions include the additives conventionally employed in sealant compositions, e.g., crystalline resins, elastomeric resins, inert fillers, etc. Particularly preferred additives are those that act as adhesion promoters, e.g., high or low amine content polyamide resins; rubbery styrene-olefin block copolymer rubbers, such as the block copolymer rubbers sometimes used as ingredients of the butyl rubber component; block copolyesters, such as those sometimes used as ingredients of the butyl rubber component, etc., and those that are inert fillers, e.g., carbon black, calcium carbonate, talc, titanium dioxide, diatomaceous earth, etc. Any combination of such ingredients may be used to achieve a desired effect.

The compositions of the invention may be used immediately or may be stored for later application with commercial hot melt sealant applicators.

The compositions of the invention are advantageous in that they are solvent-free, minimum-shrinkage sealants having excellent creep and/or sag properties, are easily applied, and have excellent moisture vapor transmission rates, good adhesion and tensile properties, and minimum tack at room temperature. A typical composition has a moisture vapor transmission rate of about 0.1 g/M²/24 hours, an initial peel value greater than 20 lbs./in. at room temperature, and a three-week, 100%-relative-humidity, 150° F. peel value greater than 10 lbs./in. at room temperature.

The following examples are given to illustrate the invention and are not intended as a limitation thereof. Unless otherwise specified, parts mentioned are parts by weight. Peel adhesion results given in the example are measures of the adhesion to glass, are obtained in accordance with Canadian Standard 19-GP-3a, paragraph 7. 3. 7, and show whether the type of failure obtained is "a" (the undesirable adhesive failure) or the more desirable "c" (cohesive failure) or "f" (film failure).

In the Examples, compositions of the invention are prepared by (1) mixing the alkaline earth metal hydroxide with the high amine content polyamide in a sigma blade mixer at about 350° F. for 20 minutes, (2) simultaneously mixing the butyl rubber component with 50% of the total amount of other ingredients in another sigma blade mixer at about 350° F. for about 10–20 minutes, (3) adding the remainder of the ingredients to the second mixer and mixing for about 5 minutes, (4) adding half of the polyamide-hydroxide reaction product to the second mixer and mixing for 20 minutes, (5) adding the remainder of the polyamide-hydroxide reaction product, and (6) continuing mixing until the total mixing time is 60 minutes. Compositions in which a polyamide-hydroxide reaction product is not used are prepared similarly except that the first sigma blade mixer is not employed.

EXAMPLE I

Prepare a hot melt sealant composition from the following recipe:

| Ingredient | Parts |
|---|---|
| Butyl rubber component* | 100 |
| Block copolyester resin** | 75 |
| Terpene phenolic resin | 30 |
| Polyisobutylene tackifying resin | 100 |

Reaction product of 5/100 mixture of calcium hydroxide and a solid polyamide resin having a molecular weight less than 10,000 and an amine value greater than about 50
*A mixture of (A) 85-125 parts of a butyl rubber having a Mooney viscosity (ML 1 + 3 at 260° F.) of 50-60, (B) 20-35 parts of the block copolyester resin defined below, (c) 25-50 parts of an ethylene-vinyl acetate copolymer, (D) 25-35 parts of diatomaceous earth, and (E) 3-7 parts of rutile grade titanium dioxide
**A thermoplastic segmented copolyester elastomer consisting essentially of about 15-30% by weight of ester units derived from butanediol and a phthalic acid and about 85-70% by weight of units derived from polytetramethylene ether glycol 1500-3500 and a phthalic acid, about 55-95% by weight of the phthalate units of the copolyester being terephthalate units The composition has a normal peel adhesion to glass of 25 lbs./in. (f) at 75° F. and 9 lbs.in. (f) at 150° F. After aging for three weeks at 150° F. and 100% relative humidity, it has a peel adhesion of 31 lbs./in. (c) at 75° F.

EXAMPLE II - CONTROL

Repeat Example I except for replacing the polyamidehydroxide reaction product with 30 parts of unreacted solid polyamide resin having a molecular weight less than 10,000 and an amine value greater than about 50. The composition has a normal peel adhesion to glass of 14 lbs./in. (f) at 75° F. and 6 lbs./in. (f) at 150° F. After aging for three weeks at 150° F. and 100% relative humidity, it has a peel adhesion of 22 lbs./in. (a) at 75° F.

EXAMPLE III

Prepare a hot melt sealant composition from the following recipe:

| Ingredient | Parts |
|---|---|
| Butyl rubber component* | 100 |
| Terpene phenolic resin | 50 |
| Polyamide having an amine value less than about 50 | 50 |
| Polyamide-hydroxide reaction product of Example I | 50 |

*A mixture of (A) 80-110 parts of a butyl rubber having a Mooney viscosity (ML 1 + 3 at 260° F.) of 50-60, (B) 35-60 parts of a styrene-ethylene-butylene-styrene block copolymer rubber, (C) 35-60 parts of the block copolyester resin of Example I, (D) 25-35 parts of diatomaceous earth, and (E) 3-7 parts of rutile grade titanium dioxide The composition has a normal peel adhesion to glass of 68 lbs./in. (c) at 75° F. and 64 lbs./in. (c) at 150° F. After aging for three weeks at 150° F. and 100% relative humidity, it has a peel adhesion of 17 lbs./in. (c) at 75° F.

EXAMPLE IV - CONTROL

Repeat Example III except for replacing the polyamidehydroxide reaction product with 50 parts of unreacted solid polyamide resin having a molecular weight less than 10,000 and an amine value greater than about 50. The composition has a normal peel adhesion to glass of 76 lbs./in. (c) at 75° F. and 37 lbs./in. (c) at 150° F. After aging for three weeks at 150° F. and 100% relative humidity, it has a peel adhesion of 8 lbs./in. (a) at 75° F.

EXAMPLE V

Prepare three hot melt sealant compositions from the following recipe:

| Ingredient | Parts |
|---|---|
| Slightly crosslinked butyl rubber having a Mooney viscosity (ML 1 + 3 at 260° F.) of about 50-60 | 100 |
| Terpene phenolic resin | 100 |
| Block copolyester resin of Example I | 100 |
| Solid polyamide resin having a molecular weight less than 10,000 and an amine value greater than about 50 | 100-110 |

In the first composition, a control composition, the polyamide is 100 parts of unreacted resin; in the second and third compositions, it is the reaction product of 100 parts of the resin with, respectively, 5 and 10 parts of calcium hydroxide.

The compositions have respective normal peel adhesions to glass of 67 lbs./in. (f), 68 lbs./in. (f), and 80 lbs./in. (f) at 75° F. and 35 lbs./in. (c), 36 lbs./in. (c), and 32 lbs./in. (c) at 150° F. After aging for three weeks at 150° F. and 100% relative humidity, they have respective peel adhesions of 0 lb./in. (a), 42 lbs./in. (f), and 23 lbs./in. (c) at 75° F.

EXAMPLE VI

Prepare a hot melt sealant composition from the following recipe:

| Ingredient | Parts |
|---|---|
| Slightly crosslinked butyl rubber having a Mooney viscosity (ML 1 + 3 at 260° F.) of about 50-60 | 85 |
| Styrene-ethylene-butylene-styrene | |

-continued

| Ingredient | Parts |
|---|---|
| block copolymer rubber | 60 |
| Block copolyester resin of Example I | 60 |
| Diatomaceous earth | 25 |
| Terpene phenolic resin | 120 |
| Polyamide resin having an amine value less than about 50 | 120 |
| Rutile grade titanium dioxide | 5 |

After aging for three weeks at 150° F. and 100% relative humidity, the composition has a peel adhesion to glass of 25.7 lbs./in. (f) at 75° F.

EXAMPLE VII

Repeat Example VI except for replacing the polyamidecalcium hydroxide reaction product with a reaction product of a 5/100 mixture of magnesium hydroxide and a solid polyamide resin having a molecular weight less than 10,000 and an amine value greater than about 50. After aging for three weeks at 150° F. and 100% relative humidity, the composition has a peel adhesion to glass of 41.7 lbs./in. (c) at 75° F.

Similar results are observed when the ingredients of the Examples are replaced by ingredients taught to be their equivalents in the specification.

It is obvious that many variations may be made in the products and processes set forth above without departing from the spirit and scope of this invention.

What is claimed is:

1. A hot melt sealant composition comprising (A) a butyl rubber component, (B) a resin selected from the group consisting of plasticizing and tackifying resins, and (C) a reacted mixture of (1) about 25-100 phr of a solid polyamide resin having a molecular weight less than 10,000 and an amine value greater than about 50 and (2) an amount of an alkaline earth metal hydroxide selected from the group consisting of magnesium, calcium, strontium, and barium hydroxides such as to provide a polyamide/hydroxide weight ratio of about 10-20/1.

2. The composition of claim 1 wherein the butyl rubber component is a slightly crosslinked butyl rubber having a Mooney viscosity (ML 1+3 at 260° F.) of about 50-60.

3. The composition of claim 1 wherein the butyl rubber component is a blend of (A) a butyl rubber, (B) an ethylene-vinyl acetate copolymer, and (C) a thermoplastic segmented copolyester elastomer consisting essentially of about 15-30% by weight of ester units derived from butanediol and a phthalic acid and about 85-70% by weight of units derived from polytetramethylene ether glycol 1500-3500 and a phthalic acid, about 55-95% by weight of the phthalate units of the copolyester being terephthalate units.

4. The composition of claim 1 wherein the butyl rubber component is a blend of (A) a butyl rubber, (B) a styrene-ethylenebutylene-styrene block copolymer rubber, and (C) a thermoplastic segmented copolyester elastomer consisting essentially of about 15-30% by weight of ester units derived from butanediol and a phthalic acid and about 85-70% by weight of units derived from polytetramethylene ether glycol 1500-3500 and a phthalic acid, about 55-95% by weight of the phthalate units of the copolyester being terephthalate units.

* * * * *

UNITED STATES PATENT OFFICE
CERTIFICATE OF CORRECTION

Patent No. 4,092,282   Dated May 30, 1978

Inventor(s) John E. Callan

It is certified that error appears in the above-identified patent and that said Letters Patent are hereby corrected as shown below:

Column 3, lines 43-44, "Reaction product of 5/100 mixture of calcium hydroxide and a solid polyamide resin having a molecular weight less than 10,000 and an amine value greater than about 50" should appear as the last ingredient in the preceding table, and --30--should be inserted beside it under "parts;" column 3, line 54, "9 lbs.in." should read --9 lbs./in.--. Column 4, line 25, "polyamidehydroxide" should read--polyamide-hydroxide--. Column 5, after line 9, insert as the last item in the table --

Polyamide-calcium hydroxide
reaction product of Example I         52.5 --

Signed and Sealed this

Thirty-first Day of October 1978

[SEAL]

Attest:

RUTH C. MASON
Attesting Officer

DONALD W. BANNER
Commissioner of Patents and Trademarks